United States Patent [19]

McCarthy

[11] 4,333,784

[45] Jun. 8, 1982

[54] MACHINE AND METHOD FOR PRODUCING WEATHERPROOFED MULTI LEAF SHIPPING FORMS

[76] Inventor: Hubert McCarthy, 424 - 51st Ave. SE., Calgary, Alberta T2H OM7, Canada

[21] Appl. No.: 131,906

[22] Filed: Mar. 20, 1980

[51] Int. Cl.[3] .............................................. B32B 31/20

[52] U.S. Cl. .................................... 156/252; 156/261; 156/267; 156/269; 156/290; 156/383; 156/513; 156/514; 156/516

[58] Field of Search ............... 156/250, 252, 254, 261, 156/269, 270, 272, 290, 383, 513, 514, 516, 267; 270/43, 52, 58; 282/12 R, 12 A, 15 B, 16 R, 16 B, 21 C; 283/18, 21

[56] References Cited

U.S. PATENT DOCUMENTS 2,154,474 4/1939 Scott .................................. 156/516

3,350,988 11/1967 Schultz .................................. 156/252

3,868,287 2/1975 Lewyckyj .......................... 156/290

*Primary Examiner*—Caleb Weston

*Attorney, Agent, or Firm*—Shlesinger, Arkwright, Garvey & Dinsmore

[57] ABSTRACT

A machine for producing weatherproofed multi leaf shipping labels including means for holding a preprinted form web, means for relieving successive portions of the web longitudinally thereof, means for applying top and bottom sheets to the web, means for encapsulating the web between the successive relieved portions of the web by pressure bonding the top and bottom sheets in face contact with each other at successive relieved portions of the web, and receiving means including means for delivering the encapsulated web to the receiving means and also the method for producing weatherproofed shipping labels.

56 Claims, 4 Drawing Figures

MACHINE AND METHOD FOR PRODUCING WEATHERPROOFED MULTI LEAF SHIPPING FORMS

This application is related to my copending application Ser. No. 46,659 filed June 8, 1979, abandoned, on a shipping form unit.

This invention relates to improvements in machines and methods for making shipping forms.

HISTORICAL BACKGROUND

In the past, the manufacture of shipping labels has been a typical machine type operation. Usually there are several stages in the operation in collating the printing and multi laminating several forms together. The various operations are done sequentially on a continuous web which is subsequently cut or otherwise divided into separate individual forms. One of the problems in shipping forms has been that of providing a form which will not be readily destroyed by weather conditions and severe handling. Shipping labels applied to boxes and the like which must endure adverse weather conditions become soggy and damp and can readily be stripped from the box or mutilated to the extent that the addressee cannot be read.

In my copending application, a form has been developed which provides a protective envelope about the information thus protecting the information from weather and adverse conditions so that the likelihood of the mailing information being destroyed is very remote. This type of forms substantially guarantees delivery for the shipper. It is an important aspect in the handling of bulk packages.

With the development of the form for protecting the labels during shipment, there has been an necessity for developing machinery to automatically produce this particular type of form. No such machinery has been available and this invention relates specifically to that type of machinery.

OBJECTS AND SUMMARY

It is therefore an object of this invention to provide a machine for producing multi leaf shipping forms which will be continuous in operation and which will utilize equipment presently available with only slight modification thereof.

Another object of this invention is to provide a machine for producing multi leaf shipping forms which disposes of the scrap material without interference with machine operation.

Still a further object of this invention is to provide a machine which is readily adaptable for various type multi layer forms so that different types of labels can be produced therewith.

A further object of this invention is to produce a machine for multi leaf shipping forms which will be adjustable for various sizes of forms.

Another object of this invention is to produce a multi leaf shipping form machine which is compact and takes in a minimum amount of area.

Still a further object of this invention is to provide a machine for producing multi leaf shipping forms which may be readily repaired upon breakdown.

Another object of this invention is to provide a method for producing multi leaf shipping forms which is adaptable to various machines and systems whether automatic, manual or compound.

These and other objects of this invention will be apparent from the following description and claims.

In the accompanying drawings which illustrate by way of example various embodiments of this invention:

FIGS. 1 THROUGH 4

Figure 1:
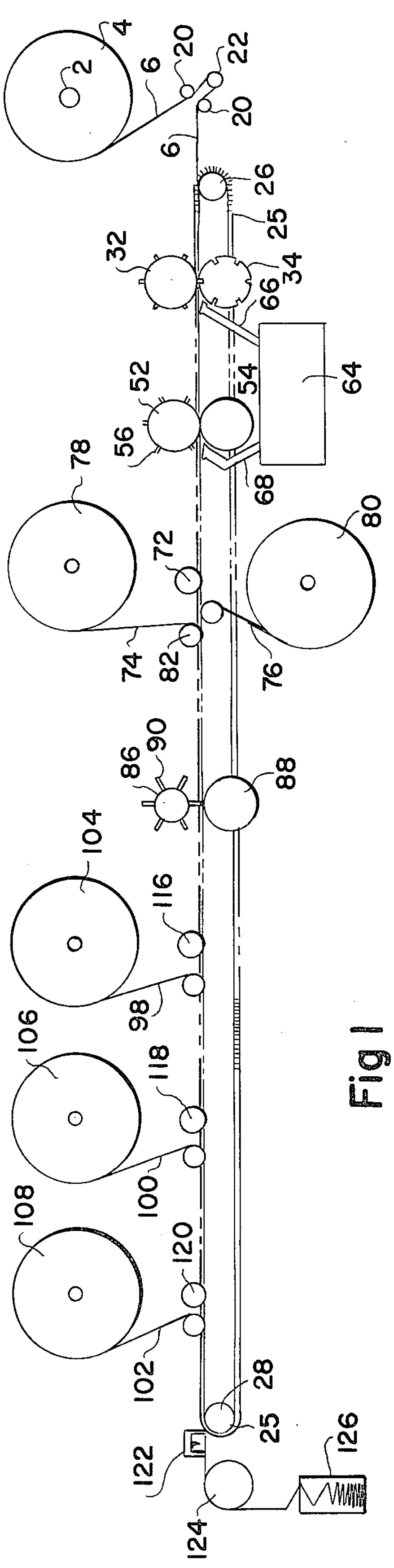
FIG. 1 is a schematic view from the side showing the machine operation and the various components used in conjunction therewith.
Figure 2:
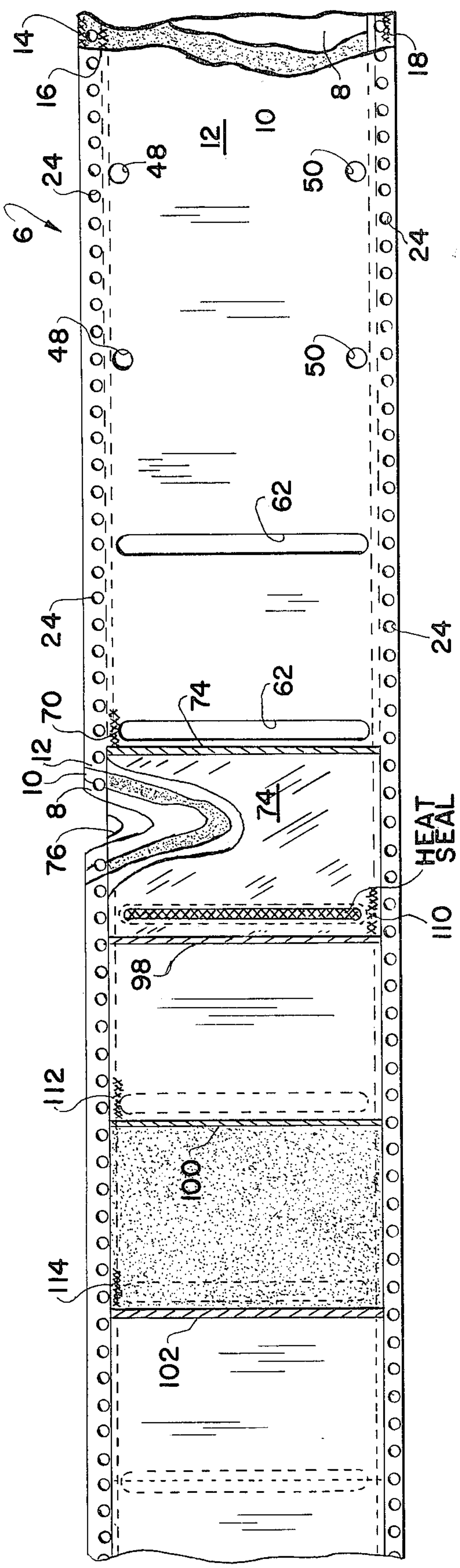
FIG. 2 is a schematic showing of the web in various phases of operation through the machine with a portion broken away to show the different laminations.

Referring now to FIGS. 1 and 2 more specifically, and to the right hand of FIG. 1, the machine for producing multi leaf shipping forms includes a roll support 2 on which is mounted a pre-printed roll 4 which comprises in this instance a multi layer web 6 best shown in FIG. 2 comprising a base sheet 8, a carbon sheet 10, and a top sheet 12. The three sheets of the web are bonded together by glue areas 14, 16 and 18. In the specific form shown, the carbon sheet 10 does not come across the entire width of the multi layer web 6. It will be obvious that instead of having a prepared multi layered preprinted roll of material 4, the initial multi layered web 6 may be continuously produced from individual rolls of carbon paper, printed paper, etc. and these laminated and fed directly into the machine and thus be a step in the overall process. Similarly other systems may be used to produce the initial web 6 at the site of operation.

The web 6 is maintained under tension by means of tension rollers 20 and 22.

The web 6 which is mounted on the roll support 2 has already been perforated as will be noted on either side by the perforations 24 best shown in FIG. 2. A feed support belt 25 is provided with a drive roll 26 and an idler roll 28. Pins 30 engage the perforations 24 thereby providing positive feed of the web through the machine. It will be obvious, that other forms of feed mechanisms might be used for maintaining the web travel through the machine such as friction rollers in conjunction with an endless belt mechanism. In the instance shown in FIG. 1, a single belt 25 is shown but multiples could be utilized.

Figure 4:
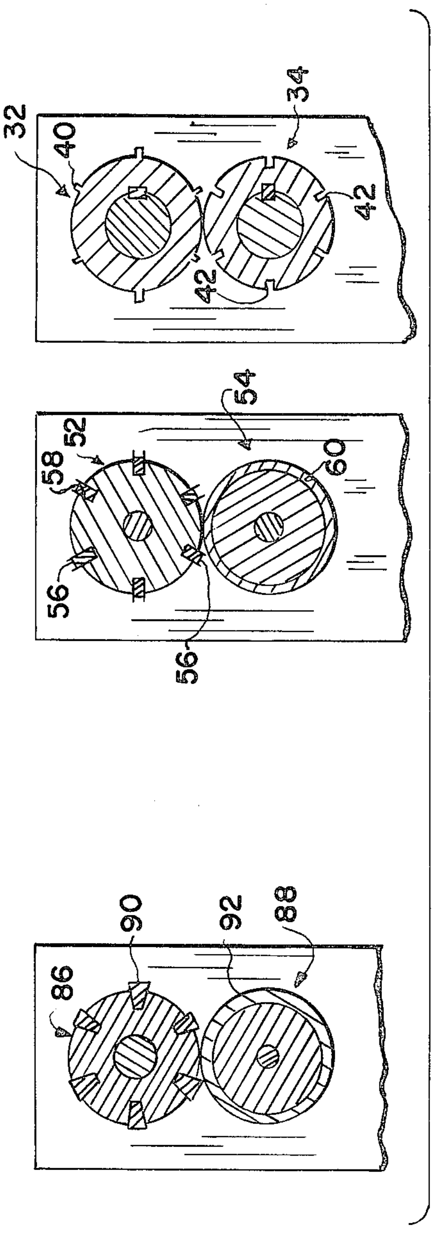
FIG. 4 is a cross sectional elevational view taken along the lines 4—4 of FIG. 3 and viewed in the direction of the arrows.

As best shown in FIG. 4, the belt 25 with the pins 30 is positioned on the left hand side of the machine. It is obvious that a similar belt drive could also be positioned on the right hand side to engage the perforations 24 on the right side of the web 6.

Figure 3:
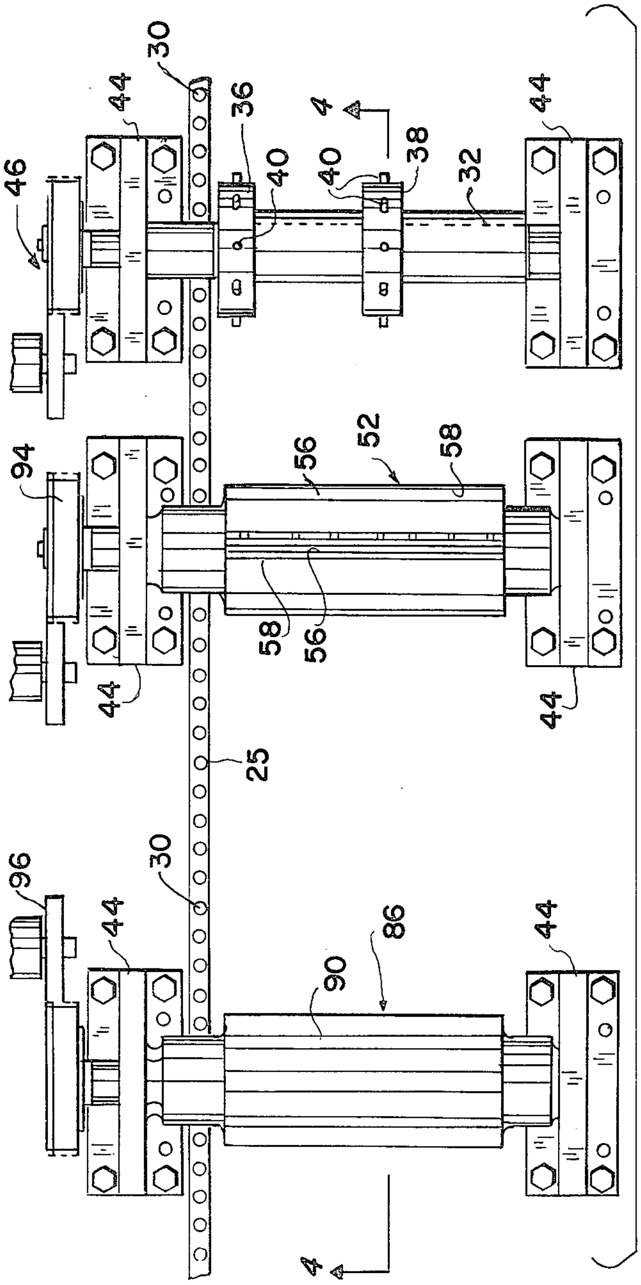
FIG. 3 is a fragmentary top plan view showing three stages of the machine including the punching, slotting and bonding units.

The web 6 fed from the roll support 2 enters between punch roll 32 and platen roll 34. As generally shown in FIGS. 3 and 4, the punch roll 32 includes a pair of punch rings 36 and 38 provided with punches 40. The punches 40 mesh with female dies 42 which may be provided with strippers ejectors or the like not shown for eliminating the punched out portions of the web 6. The rolls 32 and 34 are supported by typical journals 44 positioned on a machine support (not shown). Any type of synchronized drive mechanism 46 may be used.

As the web 6 is carried between the rolls 32 and 34, it it sequentially punched as shown in FIG. 2 to provide punch holes 48 and 50. The punch rings 36 and 38 are adjustable to various widths of material and may be positioned as desired. Various sizes of punches and spacings between punches may be used depending upon the requirements of the thickness of the web and the like. As shown in FIG. 3, the punch rings 36 and 38 are adjustable laterally on the punch and platen rolls 32 and 34.

As the web 6 moves further through the machine, a pair of slotting rolls 52 and 54 are provided. The slotting roll 52 is provided with cutters 56 which are mounted in slots 58. It will be obvious that the size of the cutters can be changed depending upon the width of the slot required for operation. It will be noted that the cutters 56 in the instance shown in FIGS. 2 and 3 correspond to the distance between the punches 40 on the punch rings 36 and 38. Thus when the cutters 56 engage the hard surface 60 of the slotting roll 54, a cut out slot 62 will be cut from the web 6. It will be noted that the slotting rolls 52 and 54 are synchronized with the punch rolls 32 and 34 so that the slots 62 are cut between the punched holes 48 and 50.

Means such as a vacuum collector 64 is provided with nozzles 66 and 68 to collect the scrap particles coming from the punched and slotted web 6.

After the punched and slotted web 6 is moved from the vacuum 64, glue 70 is applied by means of a glue applicator 72 which may be a roller or the like. In FIG. 2 it will be noted that the glue is applied on one side of the web 6.

After the application of the glue, weatherproofed sheeting 74 and 76 stored on rolls 78 and 80 is applied to the top and bottom side of the web 6. As best seen in FIG. 2, sheet 76 and sheet 74 do not come over as far as the perforations 24. The rolls 78 and 80 may be positioned on the machine in any particular area for convenience and compactness. Idler rolls 82 and 84 are provided to maintain tension on the weatherproofed sheeting 74 and 76 as it is applied to the web 6. As the web moved along with the sheets 74 and 76, it passes between pressure bonding rolls 86 and 88 which are also in synch with punching rolls 32 and 34 and slotting rolls 52 and 54 so that the web which has been slotted at 62 will come into engagement at the slots 62 with the pressure bonding members 90 on the pressure bonding roll 86 which in turn engage the platen 92 of the pressure bonding roll 88. Journals 44 are provided on the slotting and bonding rolls similar to those provided on the punching rolls. The synchronization of the drive mechanism 46 of the punching rolls 32 and 34 is tied in with the synchronization mechanism 94 of the slotting rolls and 96 of the bonding rolls (not shown).

It will be obvious that various mechanisms can be used in the bonding rolls to provide for adjustment in width and the like through changes of the pressure bonding members 90 or the rolls 86 and 88 per se.

The bonding rolls 86 and 88 may be provided with heating elements (not shown) or some other type of mechanism for applying heat to the bonding members 90 when there is used a material which requires bonding by means of heat and not just pressure alone such as polyethylene sheet etc.

After the web 6 leaves the pressure bonding area, additional multiple sheets may be applied thereto as desired. FIG. 1 shows the application of three additional sheets 98, 100, 102 from supply rolls 104, 106 and 108. These sheets may be pre-printed and include additional information for shipping. They are applied to the web 6 by means of glue areas 110, 112 and 114 which is delivered by applicators 116, 118 and 120 at the side edges of the web just inside the perforations.

After the completed laminated web leaves the left hand side of the feed support belt 25, it may be severed, creased, punched or scored by member 122. Assuming that it is merely perforated, it will then be delivered to a carrier roll 124 for depositing into a receptacle 126.

It will be obvious that a single unit for punching and slotting may be used rather than the multiple units 32, 34 and 52, 54. It will also be obvious that depending upon the thickness of the web, a larger slot opening will be necessary so that the sheet material 74 and 76 can be brought together in the slot for bonding purposes. Assuming a very thin web, less opening may be required to provide a sufficient bond at that area. It will also be obvious that the completed forms may be severed one from the other so as to leave a sufficient margin of bonded sheeting in order to encapsulate the portions of the web and maintain a sealed area. The mechanism described provides an encapsulation system somewhat similar to that used in encapsulating pills or the like with the exception that the encapsulated area is a constantly fed forward web including glued areas as well as heat bonded areas.

The method of forming a multi leaf weatherproofed shipping label as described by this invention might include other types of punching and bonding apparatus but the overall sequence of steps is important (e.g. ultrasonic bonding).

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A machine for producing multi leaf shipping forms including:

(a) means for holding a pre-printed form running length web (b) means for relieving successive transverse portions of said web and intermediate said web and extending short of the side edges of said web (c) means for applying top and bottom sheets to said web (d) means for encapsulating said web between said successive relieved portions of said web by pressure bonding said top and bottom sheets in face to face contact with each other along the length of successive relieved portions of said web, and (e) means for bonding one of said side edges of said web to said sheets while leaving at least a substantial portion of the other side edge of said web unbonded to at least one of said sheets.

2. A machine as in claim 1 and including:

(a) means for moving said web, and (b) means for guiding and tensioning said web.

3. A machine as in claim 1 and wherein:

(a) said means for encapsulating said web between said successive relieved portions of said web by pressure bonding includes heating means.

4. A machine as in claim 1 and wherein:

(a) said means for encapsulating said web between said successive relieved portions of said web by pressure bonding includes a pair of cooperating cylinders
(b) one of said pair of cylinders including a smooth surface, and
(c) the other of said pair of cylinders including a trapesoidal pressure foot.

5. A machine as in claim 1 and wherein:
(a) said means for relieving successive portions of said web includes scrap producing means, and
(b) means for removing said scrap.

6. A machine as in claim 5 and wherein:
(a) said means for removing said scrap is a vacuum.

7. A machine as in claim 1 and including:
(a) means for adding additional forms to said encapsulated webs.

8. A machine as in claim 7 and wherein:
(a) means for adding additional forms include glueing means.

9. A machine as in claim 8 and wherein:
(a) said glueing means is positioned adjacent the edges of said web and applies glue to said edges.

10. A machine as in claim 1 and wherein:
(a) said means for relieving successive portions of said web longitudinally are adjustable.

11. A machine as in claim 10 and wherein:
(a) said means for relieving and said means for encapsulating are cylinder means.

12. A machine as in claim 11 and wherein:
(a) said cylinder means includes successive pairs of cooperating cylinders having a first cylinder of each pair mounted above said web and a second cylinder of each pair mounted below said web.

13. A machine as in claim 11 and wherein:
(a) said cylinder means are synchronized through a series of gears and connecting rods to each of said cylinders.

14. A machine as in claim 10 and including:
(a) means for indexing said means for relieving successive portions of said web.

15. A machine as in claim 14 and including:
(a) means for feeding said web
(b) means for indexing said web relative to said means for encapsulating said web.

16. A machine as in claim 14 and including:
(a) means for feeding said web
(b) means for indexing said means for encapsulating said web relative to said web.

17. A machine as in claim 14 and wherein:
(a) said indexing means includes a belt having a plurality of pins engaging said web.

18. A machine as in claim 17 and wherein:
(a) said means for relieving successive portions and said means for encapsulating are positioned inside of said indexing means.

19. A machine for producing multi leaf shipping forms including:
(a) means for holding a pre-printed form running length web
(b) means for applying a top and bottom sheet to said pre-printed form web
(c) means for producing a series of transversely spaced openings in said web extending short of the side edges of said web and sufficiently wide to permit said top and bottom sheets to be brought together in face to face contact with each other through said web openings
(d) means for encapsulating portions of said web by pressure bonding said top and bottom sheets between said series of spaced openings including means for causing said pressure bonding means to engage said top and bottom sheets at said openings in said web and force said top and bottom sheets into bonding face to face contact with each other, and
(e) means for bonding one of said side edges of said web to said sheets while leaving at least a substantial portion of the other side edge of said web unbonded to at least one of said sheets.

20. A machine as in claim 19 and including:
(a) means for guiding and tensioning said web.

21. A machine as in claim 19 and wherein:
(a) said means for encapsulating portions of said web by pressure bonding includes heating means.

22. A machine as in claim 19 and wherein:
(a) said means for producing said spaced openings in said web includes scrap producing means, and
(b) means for removing said scrap.

23. A machine as in claim 22 and wherein:
(a) said means for removing said scrap is a vacuum.

24. A machine as in claim 19 and including:
(a) means for adding additional forms to said encapsulated webs.

25. A machine as in claim 24 and wherein:
(a) means for adding additional forms include glueing means.

26. A machine as in claim 25 and wherein:
(a) said glueing means is positioned adjacent the edges of said web and applies glue to said edges.

27. A machine as in claim 19 and wherein:
(a) said means producing a series of longitudinal spaced openings is adjustable.

28. A machine as in claim 27 and wherein:
(a) said means for producing said series of longitudinally spaced openings and said means for encapsulating are cylinder means.

29. A machine as in claim 28 and wherein:
(a) said cylinder means includes successive pairs of cooperating cylinders having a first cylinder of each pair mounted above said web and a second cylinder of each pair mounted below said web.

30. A machine as in claim 28 and wherein:
(a) said cylinder means are synchronized through a series of gears and connecting rods to each of said cylinders.

31. A machine as in claim 27 and including:
(a) means for indexing said means for producing said series of longitudinally spaced openings.

32. A machine as in claim 31 and including:
(a) means for feeding said web, and
(b) means for indexing said means for encapsulating said web relative to said web.

33. A machine as in claim 31 and including:
(a) means for feeding said web, and
(b) means for indexing said web relative to said encapsulating means.

34. A machine as in claim 31 and wherein:
(a) said indexing means includes a belt having a plurality of pins engaging said web.

35. A machine as in claim 34 and wherein:
(a) said means for producing a series of longitudinally spaced openings and said encapsulating means are positioned inside of said indexing means.

36. A machine for producing multi leaf shipping forms including:
(a) means for holding a pre-printed form web (b) means for punching a series of successive holes in said web
(c) means for supporting and feeding said web
(d) means for forming slots in said web between said successive holes punched in said web so that the end widths of said slots approximate the diameter of said punched holes
(e) means for applying a top and bottom sheet to said web
(f) means for supporting and feeding said top and bottom sheets simultaneously in contact with said web
(g) means for encapsulating portions of said web by said top and bottom sheets at said slots including pressure bonding means and means for causing said pressure bonding means to engage said top and bottom sheets at said slots in said web whereby said top and bottom sheets are brought into face contact with each other and bonded to each other
(h) receiving means, and
(i) means for delivering said encapsulated web to said receiving means.

37. A machine as in claim 36 and including:
(a) means for guiding and tensioning said web.

38. A machine as in claim 36 and wherein:
(a) said encapsulating means includes heating means.

39. A machine as in claim 36 and wherein:
(a) said means for forming slots includes a pair of cylinders including a first cylinder having slotting punches and a second cylinder cooperating with said first cylinder having a resilient surface.

40. A machine as in claim 36 and wherein:
(a) said means for punching and slotting includes scrap producing means, and
(b) means for removing said scrap.

41. A machine as in claim 40 and wherein:
(a) said means for removing said scrap is a vacuum.

42. A machine as in claim 36 and including:
(a) means for adding additional forms to said encapsulated webs.

43. A machine as in claim 42 and wherein:
(a) means for adding additional forms include glueing means.

44. A machine as in claim 43 and wherein:
(a) said glueing means is positioned adjacent the edges of said web and applies glue to said edges.

45. A machine as in claim 36 and wherein:
(a) said means for punching and slotting are adjustable

46. A machine as in claim 45 and wherein:
(a) said means for punching and forming slots and encapsulating are cylinder means.

47. A machine as in claim 46 and wherein:
(a) said cylinder means includes successive pairs of cooperating cylinders having a first cylinder of each pair of mounted above said web and a second cylinder of each pair mounted below said web.

48. A machine as in claim 46 and wherein:
(a) said cylinder means are synchronized through a series of gears and connecting rods to each of said cylinders.

49. A machine as in claim 45 and including:
(a) means for indexing said punching and slotting means.

50. A machine as in claim 49 and including:
(a) means for indexing said web relative to said encapsulating means.

51. A machine as in claim 49 and including:
(a) means for indexing said means for encapsulating said web relative to said web.

52. A machine as in claim 49 and wherein:
(a) said indexing means includes a belt having a plurality of pins of engaging said web.

53. A machine as in claim 52 and wherein:
(a) said means for punching and forming slots in said web and encapsulating means are positioned inside of said indexing means.

54. The method of forming a multi leaf weatherproofed shipping label including the steps of:
(a) forming a multi layered printed web
(b) producing a series of transversely spaced opening in said web extending short of the side edges of said web and having width thereto
(c) subsequently applying a top and bottom weatherproofed sheet to said web
(d) bonding said top and bottom sheets to said web by applying pressure to said sheets at said series of spaced openings to bond said sheets together in the area of said openings to encapsulate portions of said web
(e) bonding one of said side edges of said web to said sheets while leaving at least a substantial portion of the other side edge of said web unbonded to at least one of said sheets, and
(f) dividing encapsulated portions of said web into a series of individual shipping labels.

55. The method of claim 54 and including the step of:
(a) dividing said encapsulated portions of said web at the center of said bonding area openings
(b) whereby to leave a bonded portion at each edge of said weatherproofed shipping label.

56. The method of claim 54 and including the step of:
(a) adding additional printed web material on top of said encapsulated web and
(b) securing said additional printed web material to said encapsulated web prior to dividing said encapsulated portions
(c) whereby said weatherproof shipping labels included additional printed material on top of said weatherproofed labels.

* * * * *